(12) United States Patent
Bundy

(10) Patent No.: US 7,909,344 B1
(45) Date of Patent: Mar. 22, 2011

(54) ADJUSTABLE VEHICLE STEP

(75) Inventor: Troy Don Bundy, Tulsa, OK (US)

(73) Assignee: Iron Cross Automotive, Inc, Sapulpa, OK (US)

(*) Notice: Subject to any disclaimer, the term of this patent is extended or adjusted under 35 U.S.C. 154(b) by 385 days.

(21) Appl. No.: 12/147,641

(22) Filed: Jun. 27, 2008

Related U.S. Application Data

(60) Provisional application No. 61/043,222, filed on Apr. 8, 2008.

(51) Int. Cl.
*B60R 3/00* (2006.01)
(52) U.S. Cl. .......................................... 280/163; 280/169
(58) Field of Classification Search .................. 280/163, 280/164.1, 164.2, 166, 169; 248/200, 229.25, 248/231.71, 674; 296/1.07, 151, 203.1, 209; 152/215
See application file for complete search history.

(56) References Cited

U.S. PATENT DOCUMENTS

| | | | | |
|---|---|---|---|---|
| 5,769,439 A | * | 6/1998 | Thompson | 280/163 |
| 5,829,774 A | * | 11/1998 | Klemp | 280/507 |
| 6,050,579 A | * | 4/2000 | Selland et al. | 280/163 |
| 6,481,733 B1 | * | 11/2002 | Shellabarger | 280/163 |
| 6,588,783 B2 | | 7/2003 | Fichter | |
| 6,726,230 B2 | * | 4/2004 | Weir | 280/163 |
| 6,874,801 B2 | * | 4/2005 | Fichter | 280/163 |
| 7,318,596 B2 | * | 1/2008 | Scheuring et al. | 280/166 |
| 7,334,807 B2 | * | 2/2008 | Mulder et al. | 280/163 |
| 7,377,564 B1 | * | 5/2008 | Baffy et al. | 293/117 |
| 7,537,227 B1 | * | 5/2009 | Polka | 280/163 |
| 7,731,212 B2 | * | 6/2010 | Storer | 280/163 |
| 2007/0267841 A1 | * | 11/2007 | Mulder | 280/163 |

* cited by examiner

Primary Examiner — J. Allen Shriver, II
Assistant Examiner — James Triggs
(74) Attorney, Agent, or Firm — Molly D. McKay

(57) ABSTRACT

An adjustable vehicle step that attaches to the vehicle's frame or body via a downward facing c-channel that extends longitudinally along the lower edge of the side of the vehicle. One or more step assemblies can be attached to the c-channel so that the step assemblies extend outward and downward from under the vehicle. The step assemblies are attachable along the length of the c-channel, making the step assemblies adjustable longitudinally relative to the vehicle so that they can be positioned below the doors of the vehicle. The supporting c-channel is hidden from view by a decorative side bar that attaches to the exposed side of the c-channel making the step assemblies appear to be supported by the decorative side bar. The step assemblies used with the step can be made of various lengths and heights.

22 Claims, 4 Drawing Sheets

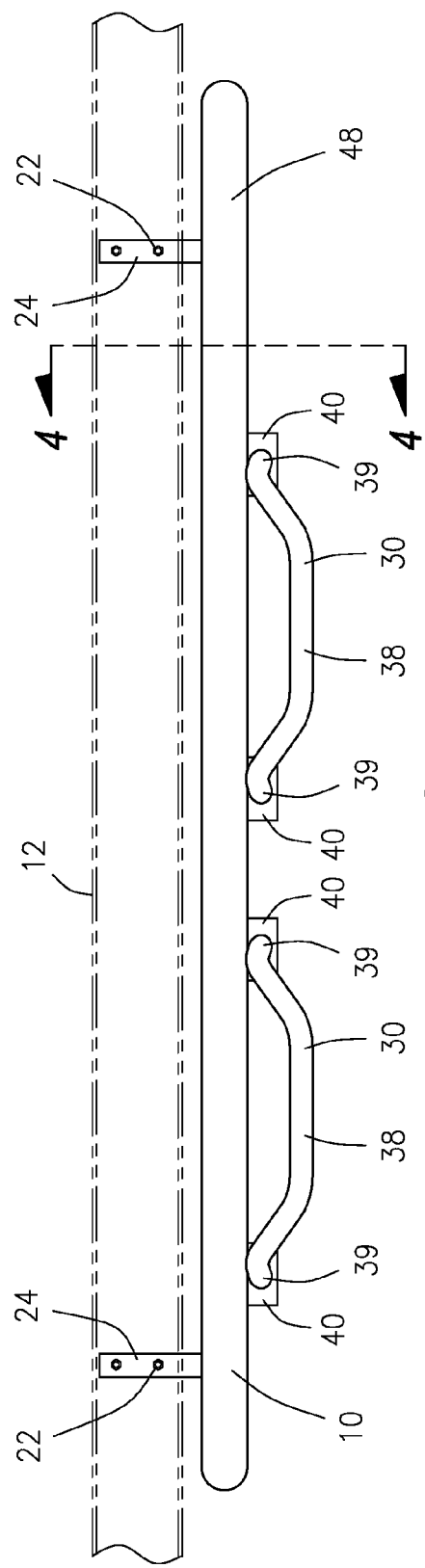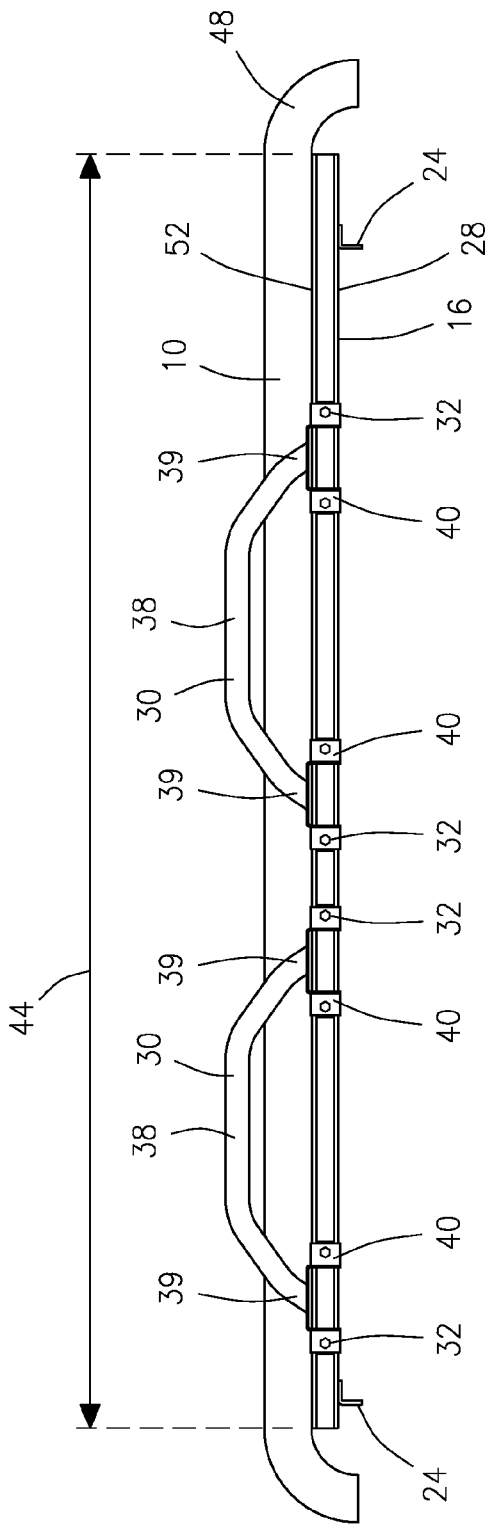

ADJUSTABLE VEHICLE STEP

CROSS-REFERENCE TO RELATED APPLICATIONS

The present invention claims priority to U.S. Provisional Patent Application Ser. No. 61/043,222 for ADJUSTABLE VEHICLE STEP which was filed on Apr. 8, 2008.

BACKGROUND OF THE INVENTION

1. Field of the Invention

The present invention is an adjustable vehicle step that attaches to the frame or body of the vehicle via a strong, downward facing c-channel that extends longitudinally along the lower edge of the side of the vehicle. One or more step assemblies can be attached to the c-channel and each step assembly extends outward and downward from under the vehicle. The step assemblies can be attached anywhere along the length of the c-channel, making the step assemblies adjustable longitudinally relative to the vehicle so that they can be located below the doors of the vehicle. The supporting c-channel is hidden from view by a decorative side bar that attaches to the c-channel in front of the c-channel so that the step assemblies appear to be supported by the decorative side bar. The step assemblies used with the step can be made of various lengths and heights.

2. Description of the Related Art

Vehicle steps of various types are on the market as aftermarket accessories. One of the problems with the currently available vehicle steps is that they are one piece devices that are not adjustable as to where longitudinally on the vehicle the step must be attached. Also, the currently available vehicle steps do not allow for easy attachment of multiple steps along the side of the vehicle. Further currently available steps do not allow the consumer to select from various widths and heights of steps that can be used together on a vehicle via a single supporting means in the form of a c-channel. Further, most of the steps currently available have the step assembly secured to the decorative side bar which is often too weak to support the force exerted on the step assembly when stepped upon by a heavy person.

The present invention addresses all of these shortcomings of prior vehicle steps by providing a step that is attached to the vehicle's frame or body via a strong, downwardly facing c-channel. The downward orientation of the c-channel prevents mud or debris from being trapped in the c-channel and allows step assemblies to be secured to the c-channel anywhere along the length of the c-channel.

Because the step assemblies are individually secured to the c-channel, multiple step assemblies can be used on each c-channel. Also, step assemblies of different widths and different heights can be employed to meet the needs and desires of the consumer and to match the dimensions of the vehicle on which the step is to be employed.

The strong supporting c-channel is hidden from view by a decorative side bar that attaches via welds to an exposed side of the c-channel thereby making the step assemblies appear to be supported by the decorative side bar.

SUMMARY OF THE INVENTION

The present invention is an adjustable vehicle step that attaches to the frame or body of the vehicle via a strong, downward facing c-channel that extends longitudinally along the lower edge of the side of the vehicle. The c-channel is bolted to the frame or body of the vehicle by metal supporting brackets that are welded to the side of the c-channel. One or more step assemblies can be attached to the c-channel via bolts that engage nuts that are captured within the c-channel by upwardly extending lips provided internally in the c-channel. Each step assembly is provided with a step portion that is welded on either end of the step portion to a step bracket 40. Each step bracket 40 is provided with bolt openings therethrough to receive bolts as a means of attaching the step assembly to the c-channel. When the step assembly is properly fastened to the c-channel, the step portion of each step assembly extends outward and downward from under the vehicle. Because the step assemblies bolt to the c-channel, the step assemblies can be attached anywhere along the length of the c-channel. This makes the step assemblies adjustable longitudinally relative to the vehicle and allows them to be located below the doors of the vehicle on which they are installed.

The supporting c-channel is hidden from view by a decorative side bar that attaches via welds to an exposed side of the c-channel thereby making the step assemblies appear to be supported by the decorative side bar. The step assemblies used with the step can be made of various lengths and heights to meet the needs and desires of the consumer and the structure of the vehicle on which the step is to be installed.

BRIEF DESCRIPTION OF THE DRAWINGS

FIG. 2 is a side view of the adjustable vehicle step of FIG. 1 showing its attachment to the frame or body of the vehicle, with the vehicle's frame or body shown in outline.

FIG. 3 is a top plan view of the adjustable vehicle step of FIG. 2 shown removed from the vehicle.

DETAILED DESCRIPTION OF THE PREFERRED EMBODIMENT

Figure 1:
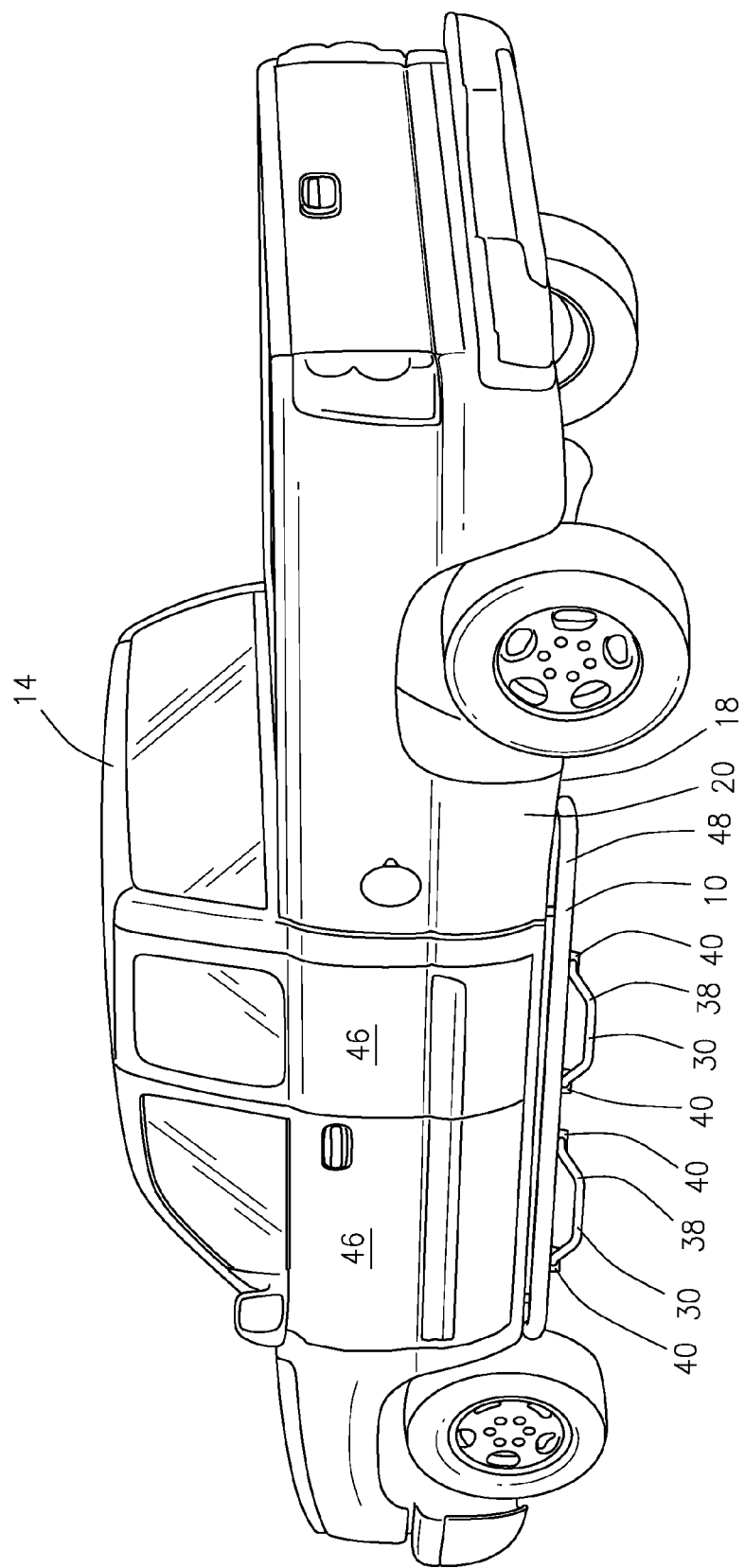
FIG. 1 is perspective view of a vehicle on which is attached an adjustable vehicle step which is constructed in accordance with a preferred embodiment of the present invention.
Figures 4, 5:
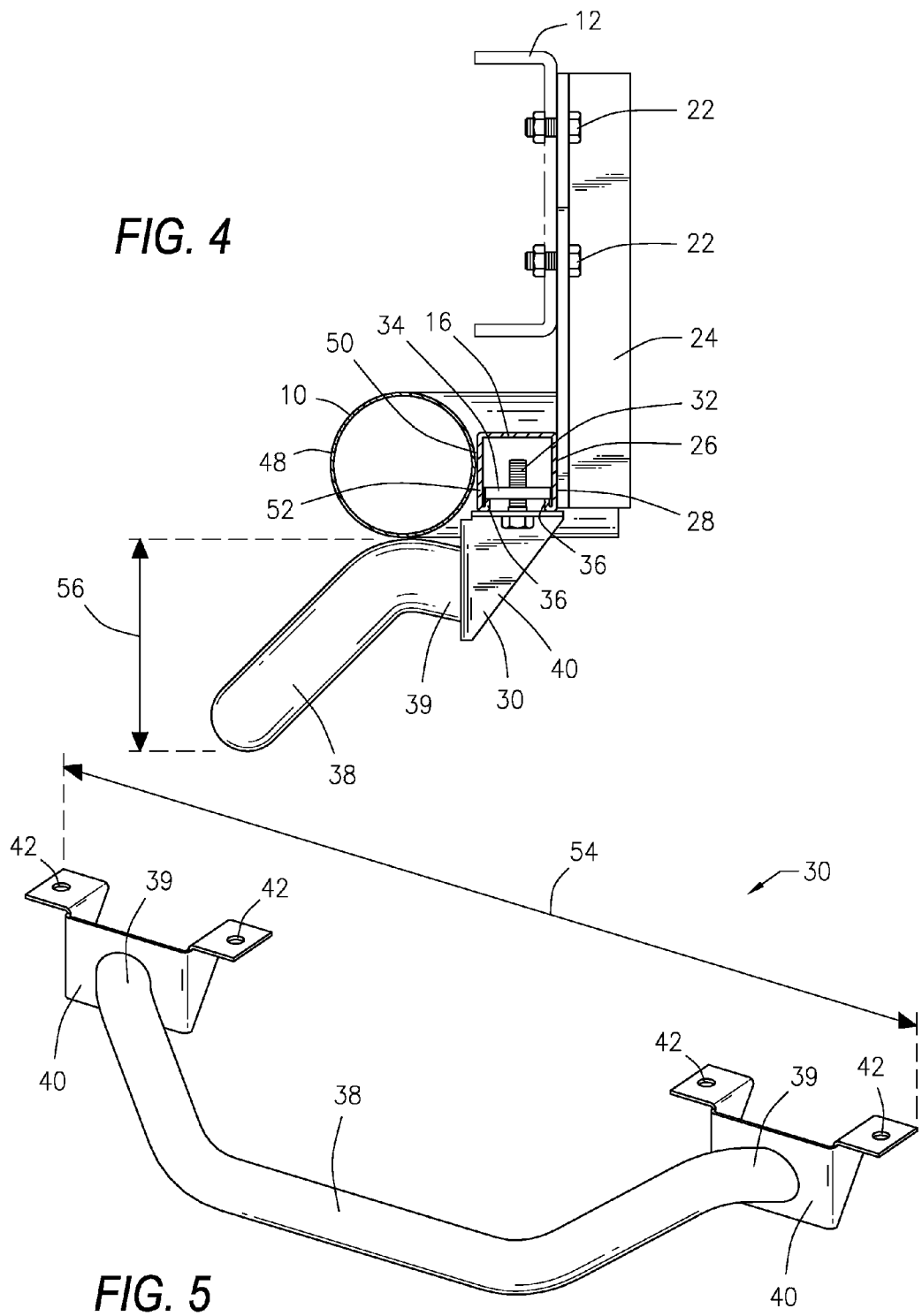
FIG. 4 is a cross sectional view taken along line 4-4 of FIG. 2.
FIG. 5 is a perspective view of a step assembly of the adjustable vehicle step shown removed from the adjustable vehicle step's supporting c-channel.

Referring now to the drawings and initially to FIG. 1, there is illustrated an adjustable vehicle step 10 that is constructed in accordance with a preferred embodiment of the present invention. The adjustable vehicle step 10 is shown in FIGS. 1 and 2 attached to a frame or body 12 of a vehicle 14 via a strong, downward facing c-channel 16 that serves as a support member for the step 10 The c-channel 16 extends longitudinally along the lower edge 18 of the side 20 of the vehicle 14. Referring also to FIGS. 3 and 4, the c-channel 16 is bolted via bolts 22 to the frame or body 12 of the vehicle 14 by metal supporting brackets 24 that are welded via weld 26 to an inwardly facing side 28 of the c-channel 16. One or more step assemblies 30 can be attached to the c-channel 16 via step bolts 32 that engage step nuts 34 that are captured within the c-channel 16 by upwardly extending lips 36 provided internally in the c-channel 16.

Referring also to FIG. 5, each step assembly 30 is provided with a step portion 38 that is welded on both of its two ends 39 to separate step brackets 40. Each step bracket 40 is provided with bolt openings 42 therethrough to receive step bolts 38 as a means of attaching the step assembly 30 to the c-channel 16.

When the step assembly 30 is properly fastened to the c-channel 16, the step portion 38 of each step assembly 30 extends outward and downward from under the lower edge 18 of the side 20 of the vehicle 14. Because the step assemblies 30 bolt to the c-channel 16, the step assemblies 30 can be attached anywhere along the length 44 of the c-channel 16, as illustrated in FIG. 3. This makes the step assemblies 30 adjustable longitudinally relative to the vehicle 14 and allows them to be located below doors 46 of the vehicle 14 on which they are installed.

As shown in FIGS. 1, 2, and 4, the supporting c-channel 16 is hidden from view by a decorative side bar 48 that attaches via welds 50 to an exposed outwardly facing side 52 of the c-channel 16 thereby making the step assemblies 30 appear to be supported by the decorative side bar 48. The decorative side bar 48 serves only a decorative purpose and does not support any of the weight of the step 10.

Referring to FIGS. 4 and 5, although different sizes and shapes of step assemblies 30 are not illustrated in the drawings, it is obvious that the step assemblies 30 used with the step 10 can be made of various lengths 54 and heights 56 to meet the needs and desires of the consumer and the structure of the vehicle 14 on which the step 10 is to be installed.

Figure 6:
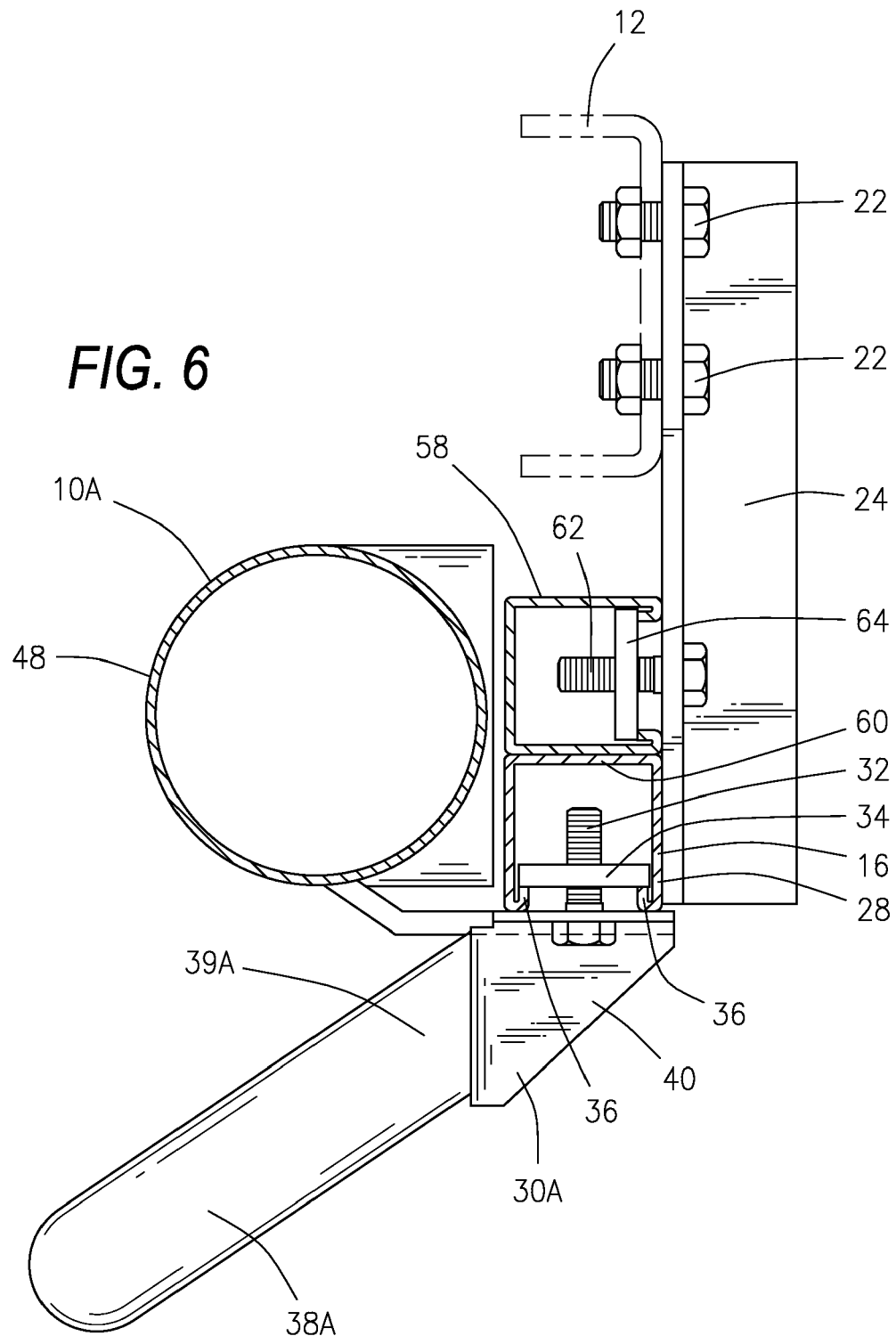
FIG. 6 is a cross sectional view of an alternate embodiment of the invention similar to the view shown in FIG. 4.

Referring to FIG. 6, an alternate second preferred embodiment adjustable vehicle step 10A is shown. This alternate second embodiment 10A differs from the first embodiment 10 in that it employs an alternate step assembly 30A with an alternate step portion 38A that is straightened at its two ends 39A where it is welded to the step brackets 40 instead of being bent as shown in FIG. 4. Also the alternate embodiment 10A is provided with a second inwardly facing c-channel 58 that is welded onto the top 60 of the downward facing c-channel 16 instead of the weld 26 between the downward facing c-channel and the metal support brackets 24. The metal supporting brackets 24 bolt to the inward facing c-channel 58 via support bracket bolts 62 and support bracket nuts 64 rather than being welded to it as shown in FIG. 4. Also, the decorative side bar 48 either welds or is bolted to the bottom of the downwardly facing c-channel 16 instead of being welded to the exposed outwardly facing side 52 of the downwardly facing c-channel 16. In all other respects, the alternate embodiment adjustable vehicle step 10A is like the preferred embodiment 10.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. An adjustable vehicle step comprising:
a first c-channel securable to the frame or body of a vehicle in a downwardly facing orientation, said first c-channel extending along the length of the vehicle,
at least one step assembly attached directly to the first c-channel and supported by the first c-channel, and
a decorative side bar attached to the first c-channel at the side of the first c-channel so that the decorative side bar hides the first c-channel from view and appears to support the step assemblies.

2. An adjustable vehicle step according to claim 1 further comprising:
a second c-channel attached to said first c-channel, and
said first c-channel securable to the frame or body of a vehicle via said second c-channel.

3. An adjustable vehicle step according to claim 2 further comprising:
said second c-channel attached to at least two supporting brackets which are securable to the frame or body of a vehicle as a means of securing the first c-channel to the frame or body of a vehicle.

4. An adjustable vehicle step according to claim 3 further comprising:
removable fasteners attaching said step assemblies to said first c-channel.

5. An adjustable vehicle step according to claim 4 further comprising:
removable fasteners attaching said second c-channel to each of the supporting brackets.

6. An adjustable vehicle step according to claim 5 further comprising:
removable fasteners for attaching each of the supporting brackets to the frame or body of a vehicle.

7. An adjustable vehicle step according to claim 2 wherein said step assembly further comprises:
a step portion having two ends, each end of the step portion secured to a step bracket, each step bracket secured to the first c-channel.

8. An adjustable vehicle step according to claim 1 further comprising:
said first c-channel attached to at least two supporting brackets which are securable to the frame or body of a vehicle as a means of securing the first c-channel to the frame or body of a vehicle.

9. An adjustable vehicle step according to claim 8 further comprising:
removable fasteners for attaching each of the supporting brackets to the frame or body of a vehicle.

10. An adjustable vehicle step according to claim 8 further comprising:
removable fasteners attaching said step assemblies to said first c-channel.

11. An adjustable vehicle step according to claim 1 wherein said step assembly further comprises:
a step portion having two ends, each end of the step portion secured to a step bracket, each step bracket secured to the first c-channel.

12. An adjustable vehicle step comprising:
a first c-channel securable to the frame or body of a vehicle so that the first c-channel is held below and parallel to the side of the vehicle and extends along the length of the vehicle,
at least one step assembly adjustably attached to the first c-channel so that the step assembly can be adjusted horizontally, and
a decorative side bar attached to the first c-channel so that the decorative side bar extends the length of the first c-channel and parallel to it so that it hides the first c-channel from view and appears to support the step assemblies.

13. An adjustable vehicle step comprising:
a first c-channel securable to the frame or body of a vehicle so that the first c-channel is held below and parallel to the side of the vehicle and extends along the length of the vehicle,
at least one step assembly adjustably attached to the first c-channel,
a decorative side bar attached to the first c-channel so that the decorative side bar extends the length of the first c-channel and parallel to it so that it hides the first c-channel from view and appears to support the step assemblies, an second c-channel welded to said first c-channel, and
said first c-channel securable to the frame or body of a vehicle via said second c-channel.

14. An adjustable vehicle step according to claim 13 further comprising:
said second c-channel attached to at least two supporting brackets which are securable to the frame or body of a vehicle as a means of securing the first c-channel to the frame or body of a vehicle.

15. An adjustable vehicle step according to claim 14 further comprising:
removable fasteners attaching said step assemblies to said first c-channel.

16. An adjustable vehicle step according to claim 15 further comprising:
removable fasteners attaching said second c-channel to each of the supporting brackets.

17. An adjustable vehicle step according to claim 16 further comprising:
removable fasteners for attaching each of the supporting brackets to the frame or body of a vehicle.

18. An adjustable vehicle step according to claim 13 wherein said step assembly further comprises:
a step portion having two ends, each end of the step portion secured to a step bracket, each step bracket adjustably secured to the first c-channel.

19. An adjustable vehicle step according to claim 12 further comprising:
said first c-channel attached to at least two supporting brackets which are securable to the frame or body of a vehicle as a means of securing the first c-channel to the frame or body of a vehicle.

20. An adjustable vehicle step according to claim 19 further comprising:
removable fasteners for attaching each of the supporting brackets to the frame or body of a vehicle.

21. An adjustable vehicle step according to claim 19 further comprising:
removable fasteners adjustably attaching said step assemblies to said first c-channel.

22. An adjustable vehicle step according to claim 12 wherein said step assembly further comprises:
a step portion having two ends, each end of the step portion secured to a step bracket, each step bracket secured to the first c-channel.

* * * * *